United States Patent [19]
Dymond

[11] 3,817,266
[45] June 18, 1974

[54] HYDRAULIC SYSTEM WITH FLOW CONTROL MEANS TO CONTROL PRESSURE DISTRIBUTION BETWEEN A PRIMARY AND A SECONDARY HYDRAULIC CIRCUIT

[75] Inventor: Richard Warren Dymond, Rochester, Mich.

[73] Assignee: TRW Inc., Cleveland, Ohio

[22] Filed: Mar. 20, 1972

[21] Appl. No.: 236,422

[52] U.S. Cl. .............................. 137/116, 137/118
[51] Int. Cl. ............................................ F16k 11/07
[58] Field of Search ..................... 137/118, 115, 116

[56] References Cited
UNITED STATES PATENTS

| | | | |
|---|---|---|---|
| 3,334,705 | 8/1967 | Lam | 137/118 X |
| 3,575,192 | 4/1971 | MacDuff | 137/118 X |
| 3,628,558 | 12/1971 | Bahl | 137/118 |
| 3,703,186 | 11/1972 | Brewer | 137/118 X |

Primary Examiner—William R. Cline
Attorney, Agent, or Firm—Hill, Gross, Simpson, Van Santen, Steadman, Chiara & Simpson

[57] ABSTRACT

A hydraulic system for supplying a primary and a secondary hydraulic circuit, the system having a pump and means forming an orifice through which fluid at the pump pressure is directed. A flow control means is provided in fluid communication with the pump, the flow control means including a slidable valve means which is responsive to changes in the pressure drop across the orifice and has porting means to control the distribution of fluid to the primary and secondary hydraulic circuit. A separate control valve in each of the hydraulic circuits cooperates with the flow control means to direct fluid only to the primary circuit when the pump output is below a predetermined value and to direct fluid flow in both circuits when the pump output is above the predetermined value, the flow rate to the primary circuit being substantially constant.

5 Claims, 5 Drawing Figures

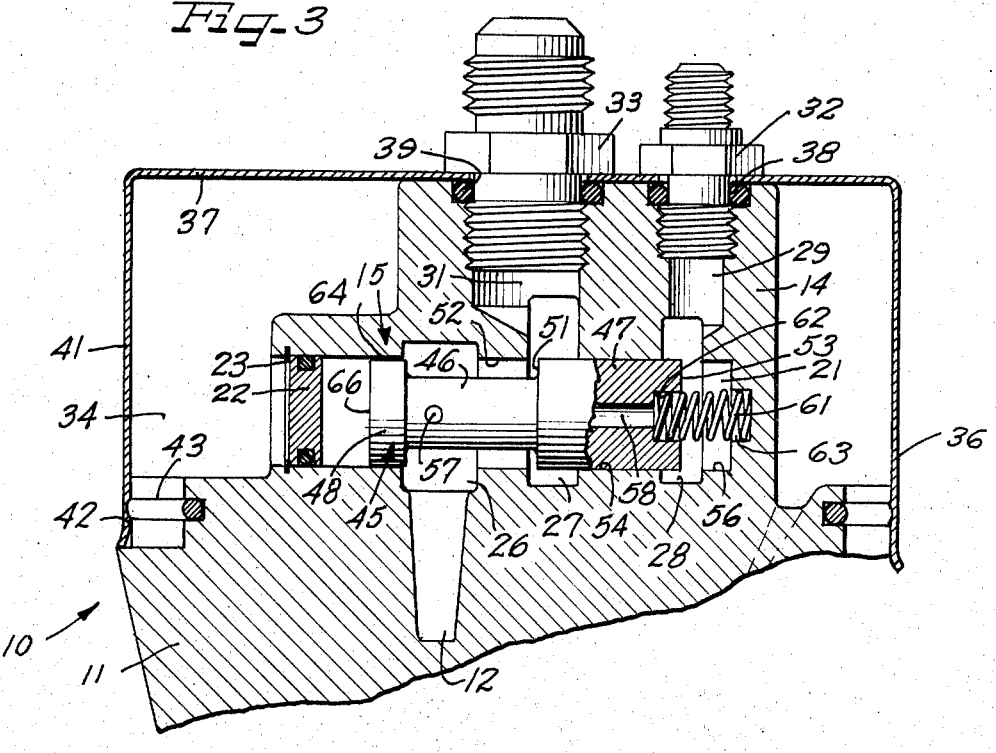

HYDRAULIC SYSTEM WITH FLOW CONTROL MEANS TO CONTROL PRESSURE DISTRIBUTION BETWEEN A PRIMARY AND A SECONDARY HYDRAULIC CIRCUIT

BACKGROUND OF THE INVENTION

1. Field of the Invention

This invention generally relates to hydraulic systems and more particularly refers to combination pump and flow regulators.

2. Description of the Prior Art

In power assisting systems, such as a power steering system for an automotive vehicle, a pump of the type having an output flow rate increasing proportional to the pump speed may be utilized to supply the required flow of fluid. Normally, in a power steering pump, a control flow valve is provided so that after a predetermined flow rate to the steering circuit is achieved, excess fluid being pumped is returned directly to the pump suction or inlet port.

SUMMARY OF THE INVENTION

In accordance with the present invention, a hydraulic system such as a power steering system for a vehicle, utilizes a single pump in combination with a flow control means for supplying the output of the pump to both a primary hydraulic circuit and a secondary hydraulic circuit, for example, a hydraulic cylinder for an implement lift.

Assume the pump is operating at some speed above $n_1$ so there is flow in both circuits and that the pump is delivering seven gallons per minute with three gallons per minute going to the primary circuit and four gallons per minute going to the secondary circuit.

Each circuit has in it a variable orifice, or control valve, which controls the actuator in its corresponding circuit. When neither actuator is being used, fluid from the pump can flow freely through the main flow control valve and through the circuit control valves, which will be in an open position.

When the operator wishes to operate one of the actuators, he will begin to close the corresponding circuit control valve. Since the other circuit control valve will remain in an open position, something must happen or all flow will simply flow to the other unrestricted circuit. This is prevented from happening by the main flow control valve.

As soon as the flow to the operated circuit starts to diminish, the pressure drop across the orifice will diminish and the spring will urge the main flow control valve to a new position, whereby flow to the port leading to the other circuit is restricted. The more the circuit control valve closes, the more the main control valve port is restricted by the main flow control valve, thus maintaining the desired flow split to the two circuits. Pressure thus developed in the first circuit can be utilized to move its actuator. The foregoing is a description of mode II operation.

In mode III operation, the operator wishes to operate the actuator for the other circuit while the first circuit is in an open (free flow) condition. As the circuit control valve starts to close, there is a tendency for the flow in the first circuit to increase. A slight increase in flow results in a larger pressure drop across the orifice which causes the main flow control valve to move in a direction to restrict fluid flow to the port leading to the first circuit. The more the main control valve is closed, the more the port is restricted by the main flow control valve to maintain the desired flow split in the two circuits.

Thus either circuit can be energized independent of conditions in the other circuit. While the foregoing example uses only one actuator at a time, it should be understood that they can be used simultaneously also.

BRIEF DESCRIPTION OF THE DRAWINGS

FIG. 3 is a view similar to FIG. 1 and illustrates the flow regulator in a position corresponding to a third mode of operation of the same;

FIG. 4 is a partial, cross sectional view, with parts shown in elevation of a combined pump and flow regulator of the present invention in combination with a pressure relief valve embodying features of the present invention; and FIG. 5 is a schematic plumbing diagram illustrating the structure and operation of the present invention.

DETAILED DESCRIPTION OF CERTAIN PREFERRED EMBODIMENTS

Figure 1:
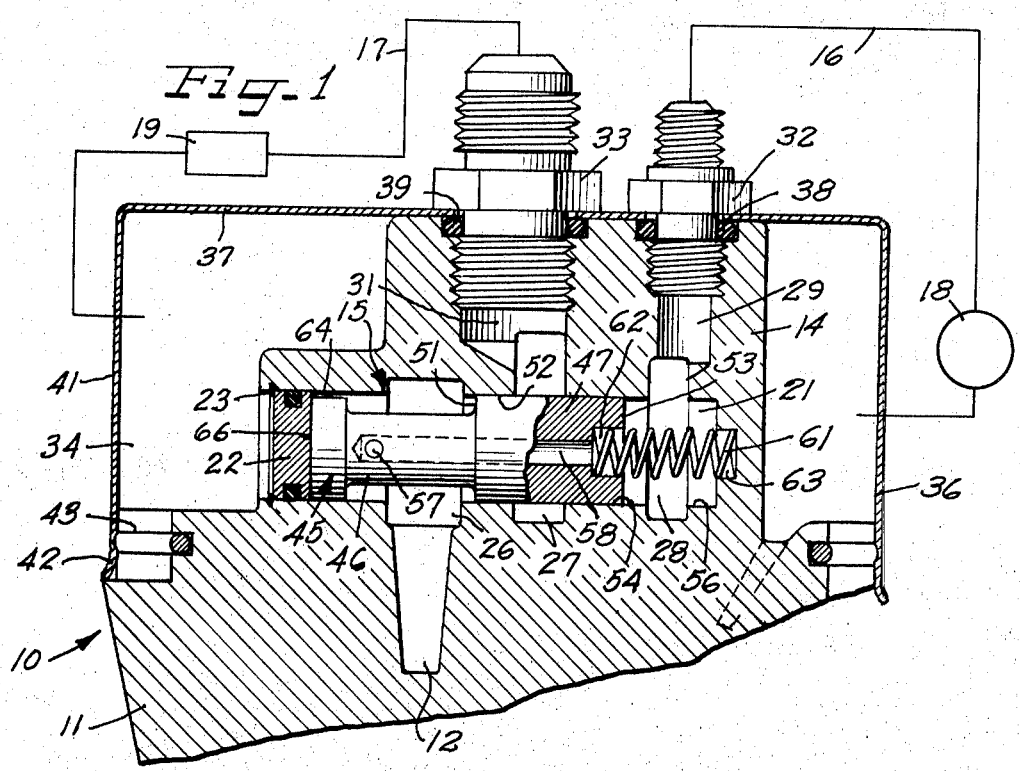
FIG. 1 is a partial cross sectional view with parts shown in elevation of a combined pump and flow regulator embodying the principles of the present invention and with portions of a hydraulic system, including the pump and flow regulator, shown schematically.

Referring to FIG. 5, pump generally indicated at 10 discharges through a port 12 leading to a main flow control valve 15. The pump 10 is of the type having an output flow rate increasing substantially proportional to the pump speed and may be a slipper type pump, such as shown and described in Drutchas Patent No. 3,146,719, issued Sept. 1, 1964, or any other suitable design.

The pump housing 11 may have an enlarged boss 14 overlying the pump outlet port 12 thereby to house the flow control valve 15 as an integral part of the pump assembly.

In accordance with the principles of the present invention, the flow regulator 15 regulates and distributes the pump outlet to a pair of separate hydraulic circuits, including a primary circuit 16 and a secondary circuit 17. In one example of the present invention, the primary circuit 16 comprised a power steering circuit including a power assisting device 18, whereas the secondary or auxiliary circuit 17 may comprise an implement line on a farm tractor, for example, a hydraulic cylinder 19 for implement lift.

The circuit 16 has a circuit control valve in it labelled by legend "control valve No. 1" and the circuit 17 has a circuit control valve in it labelled by legend "control valve No. 2."

In general operation, the present invention contemplates that when neither actuator 18 or 19 is being used, fluid from the pump 10 flows freely through the main flow control valve 15 and through the control valves 1 and 2 which will be in an open position.

When the operator wishes to operate the actuator 18, he will begin to close the corresponding control valve 1, whereupon the main flow control valve 15 will close down the port 27, the diminished flow to the circuit 16 operating to diminish the pressure drop across the orifice and moving the valve spool 45 to maintain a desired flow split to the two circuits 16 and 17.

As illustrated in FIGS. 1 and 3, the boss 14 has a bore 21 opening at one side of the boss and forming a valve chamber. The opened end of the bore 21 is closed by a cap 22 retained in position by a snap ring 23. Axially spaced along the bore 21 are three undercut, circumferential recesses 26, 27 and 28. The recess 26 is in alignment with the pump outlet port 12, thereby providing fluid communication between the pump and the valve chamber. The other two recesses 27 and 28, respectively, intersect a primary circuit supply port 29 and a secondary circuit supply port 31.

The supply ports 29 and 31 are machined in the boss 14 and threaded to receive threaded couplings as at 32 and 33.

An inlet reservoir 34 for the combined pump and flow regulator 10 may be formed across the boss 14 by a sheet form cap 36. The sheet form cap 36 includes a top wall 37 having apertures 38 and 39 disposed in alignment with the supply ports 29 and 31 so that the coupling members 32 and 33 may be utilized to secure the cap to the boss. A depending sidewall 41 is outwardly spaced from a periphery of the boss 14 and has a lower edge portion 42 outwardly overlapping the pump housing 11 with an appropriate seal ring 43 interposed therebetween, thereby to form the reservoir 34. An inlet port, not shown, communicates the reservoir 34 with the pumping chamber.

The flow control valve 15 further includes a spool member 45 linearly adjustable in the bore 21 on a valve axis extending through the valve chamber. The spool 45 comprises a cylindrical member having a reduced diameter throat 46 extending between a body portion 47 and a head portion 48 disposed adjacent the cap 22.

An annular shoulder 51 at one end of the valve body 47 forms a valve land for cooperation with an annular control land 52 extending between the adjacent annular recesses 26 and 27 to regulate the flow of fluid from the outlet port 12 to the secondary supply port 31 upon axial adjustment of the spool valve 45 within the valve chamber 21. In a like manner, a valve land 53 formed at the other end of the valve body 47 cooperates with a control land 56 to regulate the flow of fluid to the primary circuit supply port 29.

A first flow path interconnecting the pump outlet 12 with the primary supply port 29 includes an orifice 57 formed in the valve spool throat 46 and intersecting an axial passageway 58. The axial passageway opens into the valve chamber 21 near the annular recess 28. A second flow path between the outlet port 12 and the secondary supply port 31 is formed by the annular space between the reduced diameter throat 46 and the control land 52 whenever the spool valve is adjusted with the valve land 51 disposed to the right of the control land 52.

In order to preload the spool valve 45 for control purposes, a continuous biasing means urges the spool valve in a direction to block the flow path from the outlet port 12 to the recess 27 and the secondary supply port 31. As illustrated, the continuous biasing means may include a coil compression spring 61 having one end bottomed in a counterbore 62 formed in the spool valve body in alignment with the passageway 58 and another end bottomed in a recess 63 formed in the boss 14, thereby to bias or load the spool valve towards a normally closed position wherein all flow from the pump outlet port 12 passes through the orifice 57 to the primary supply port 29.

It will be understood that fluid flow from the pump outlet port 12 through the orifice 57 creates a pressure differential on opposite sides of the orifice. Accordingly, the valve head 48 may be relieved or slotted as at 64 to communicate the pump outlet pressure to a rear motive surface 66 at the end of the valve head 48.

Figure 2:
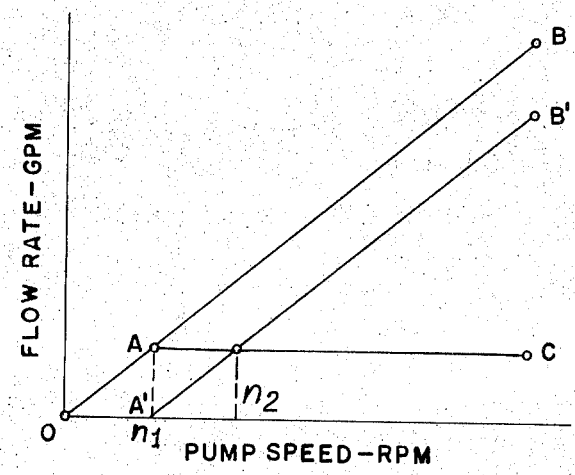
FIG. 2 is a graph showing the flow curve of the pump outlet, and secondary and primary circuits receiving fluid flow from the flow regulator of the present invention.

As illustrated in FIG. 2, wherein is shown a graph having pump speed as the abscissa and output flow rate of the pump as the ordinate, the flow rate or output rate of the pump increases as a function of pump speed, as shown by the line OAB. When the pump operation is initiated, the spool valve 45 is in the position illustrated in FIG. 1, and as fluid flows through the orifice 57, a pressure drop is created resulting in a pressure force on the motive surface 66 in opposition to the summation of the forces exerted by the coil compression spring 61 and the lower pressure acting on the other end of the spool valve, which includes the valve land 53.

Mode I — Flow in the Primary Circuit Only.

At low pump speeds, and thus at low flow rates, as the flow rate increases from zero, the pressure drop created by flow through the orifice 57 increases until a point is reached where the pressure force just equals the spring force. Any further increase in flow will cause the spool valve 45 to move against the bias of the spring 61 (to the right as illustrated in FIG. 1) until the valve land 51 clears the control land 52 to open the annular recess 27 for communicating the secondary circuit 17 with the pump outlet port 12. During the first mode of operation, at pump speeds and flow rates below a preselected minimum required to linearly adjust the spool valve to open the secondary port 31, the flow rate in the primary circuit 16 will substantially equal the output flow rate of the pump.

Mode II — Flow in Both Circuits with the Primary Circuit Pressure Higher than the Secondary Circuit Pressure Assume the pump 10 is operating at some speed above $n_1$ so there is flow in both circuits 16 and 17 and that the pump 10 is delivering seven gallons per minute with three gallons per minute going to the primary circuit 16 and four gallons per minute going to the secondary circuit 17.

Each circuit has in it a variable orifice, or control valve, indicated at No. 1 for circuit 16 and at No. 2 for circuit 17, which controls the actuator 18 or 19 in its corresponding circuit. When neither actuator 18 or 19 is being used, fluid from the pump 10 can flow freely through the main flow control valve 15 and through the circuit control valves 1 and 2, which will be in an open position.

When the operator wishes to operate actuator 18, he will begin to close circuit control valve 1. Since the other circuit control valve will remain in an open position, something must happen or all flow will simply flow to the other unrestricted circuit. This is prevented from happening by the main flow control valve 15.

As soon as the flow to circuit 16 starts to diminish, the pressure drop across the orifice 57 will diminish and the spring will urge the main flow control valve 15 to a new position, whereby flow to the port leading to circuit 17 is restricted. The more circuit control valve 1 closes, the more the port leading to circuit 17 is restricted by the main flow control valve 15, thus maintaining the desired flow split to the two circuits 16 and 17. Pressure thus developed in the first circuit 16 can be utilized to move its actuator 18. The foregoing is a description of mode II operation.

Mode III — Flow in Both Circuits with the Secondary Circuit Pressure Higher than the Primary Circuit Pressure In mode III operation, the operator wishes to operate the actuator 19 for the other circuit 17 while the first circuit 16 is in an open (free flow) condition. As the circuit control valve 2 starts to close, there is a tendency for the flow in the first circuit 16 to increase. A slight increase in flow results in a larger pressure drop across the orifice 57 which causes the main flow control valve 15 to move in a direction to restrict fluid flow to the port 29 leading to the first circuit 16. The more control valve 2 is closed, the more the port 29 is restricted by the main flow control valve 15 to maintain the desired flow split in the two circuits 16 and 17.

Thus either circuit can be energized independent of conditions in the other circuit. While the foregoing examples uses only one actuator at a time, it should be understood that they can be used simultaneously also.

It is also contemplated by the present invention to provide a pressure relief valve. As illustrated in FIG. 4, the pump outlet port 12 may be intersected by a bored hole 81 containing a valve spool member 82. The hole 81 has a reduced section 83 opening into the pump reservoir 34, a larger intermediate portion 84 having the valve member 82 received therein for linear movement and a still larger end portion opening at a side 87 of the pump housing 11. The opened end of the bore 81 is closed by a coupling member 88.

The spool valve 82 has an end portion 89 urged into abutment against a shoulder 91 by a coil compression spring 92 received in the enlarged bore end portion 86. One end of the spring 92 bottoms against the coupling 88 and the opposite end portion engages the spool valve 82 to preload the same against the shoulder 91.

A passage 93 formed in a reduced diameter, intermediate portion 94 of the spool valve is in fluid communication with the pump outlet 12 and opens into an axial chamber 95 within the valve member.

The spool valve 82 houses a ball 96 within the chamber 95. The ball 96 is urged into engagement with ball seat 97 by a spring 98, thereby controlling the flow of fluid through the passage 93. The spring force provided by the spring 98 may be adjusted by a threaded plug 99 threadedly received in the chamber 95 of the valve member, to enable adjustment of the preloading force on the ball 96.

In operation, when pump pressure is below the set pressure required to unseat the ball 96, the valve will be held in the closed position against the shoulder 91 by the spring 92. When pump pressure reaches the set value, the ball will become unseated allowing fluid to flow from the pump outlet port 12 through the passage 93 and into the smaller portion 83 of the bore 81. Exit of fluid from the bore 81 into the reservoir 34 is restricted by an orifice 101, which creates a pressure buildup behind the valve spool 82 for overcoming the biasing force of the spring 92, thereby shifting the valve spool away from the shoulder 91. The valve spool 82 will shift against the urging of the spring 92 until an axial valve land 102 on the spool valve opens the pump outlet 12 to the enlarged end 86 of the bore 81, which is connected to a tank by the hollow coupling 88. Thus, the spring biased ball 96 acts as a pilot valve to open the pump outlet 12 to a large area capable of handling the entire pump output with minimum pressure differential between cracking and full bypass.

Although minor modifications might be suggested by those versed in the art, it should be understood that I wish to embody within the scope of the patent warrented hereon all such modifications as reasonably and properly come within the scope of my contribution to the art.

I claim as my invention:

1. Flow control means for use in a hydraulic system of the type comprising pumping means having an outlet port and an inlet port in association with means forming a primary hydraulic circuit and a separate secondary hydraulic circuit comprising:

means forming a valve chamber in fluid communication with the pump outlet port;

a spool valve linearly movable in said valve chamber and having an orifice through which fluid flow from the pump outlet port is directed, said chamber having axially spaced control lands and openings forming a first flow path which together which said orifice communicates the pump outlet port with the primary circuit and a second flow path for communicating the pump outlet port with the secondary circuit, continuous biasing means loading said valve in one direction; action surfaces on said spool valve subject to the pressures on opposite sides of said orifice to adjust the spool valve linearly against said bias as a function of the pressure drop across said orifice;

first and second axially spaced valve lands and a recess on said spool valve controlling the flow of fluid to the secondary circuit as a function of the movement of said valve, said axially spaced valve lands being disposed relative to said control lands and said openings in said valve chamber to supply fluid only to said primary circuit during a first mode of operation whenever the pump flow rate is below a preselected level and to direct the fluid flow to both the primary and secondary circuits whenever the flow rate exceeds the preselected level;

a pressure relief valve comprising a cored passage intersecting and connecting to said outlet port, a second spool valve in said passage, biased against a valve seat by a spring, a second passage in said second spool valve connecting said outlet port to an exit port, said second passage being maintained in normally closed position by a spring-biased ball, a stationary chamber at the exit port end of said second spool valve having a restricting orifice in communication with said exit port thereby to create pressure buildup behind said second spool valve upon opening of said ball and move said second spool valve to a position to open a large area which can handle the entire pump output with minimum pressure differential between cracking and full bypass.

2. Flow control means as defined in claim 1 and a separate control valve in said primary circuit and in said secondary circuit,
   whereby activation of any said control valve in one of said circuits will automatically adjust the positioning of said spool valve to regulate the supply of fluid to the other circuit.

3. Flow control means as defined in claim 1 and further characterized by:
   said axially spaced valve lands being disposed relative to said control lands and said openings in said valve chamber to maintain a constant flow to the primary circuit whenever the pump flow rate is above the preselected value irrespective of the pressure in said secondary circuit.

4. Flow control means as defined in claim 2 and further characterized by said valve lands being disposed relative to said control lands and said openings in said valve chamber to modulate the flow to said secondary circuit whenever the pressure in said secondary circuit is below that of said primary circuit in a manner to maintain a substantially constant flow to said primary circuit.

5. Flow control means as defined in claim 2 and further characterized by:
   said axially spaced valve lands being disposed relative to said control lands and said openings to throttle the flow to the primary circuit whenever the pressure in the secondary circuit exceeds that of the primary circuit in a manner to maintain a constant flow to the primary circuit.

* * * * *